United States Patent
Cao et al.

(10) Patent No.: US 10,747,769 B2
(45) Date of Patent: Aug. 18, 2020

(54) TEXT REPRESENTATION METHOD AND APPARATUS

(71) Applicant: International Business Machines Corporation, Armonk, NY (US)

(72) Inventors: Feng Cao, Shanghai (CN); Yuan Ni, Shanghai (CN); Qiongkai Xu, Shanghai (CN); Hui Jia Zhu, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 412 days.

(21) Appl. No.: 14/920,341

(22) Filed: Oct. 22, 2015

(65) Prior Publication Data

US 2016/0154800 A1   Jun. 2, 2016

(30) Foreign Application Priority Data

Nov. 28, 2014  (CN) .......................... 2014 1 0705205

(51) Int. Cl.
*G06F 16/2457*  (2019.01)
*G06F 16/901*   (2019.01)

(52) U.S. Cl.
CPC .... *G06F 16/24575* (2019.01); *G06F 16/9024* (2019.01)

(58) Field of Classification Search
CPC .............................................. G06F 16/24575
See application file for complete search history.

(56) References Cited

U.S. PATENT DOCUMENTS

| | | | |
|---|---|---|---|
| 6,823,331 B1* | 11/2004 | Abu-Hakima | G06F 16/34 707/758 |
| 8,620,964 B2 | 12/2013 | Tsatsou et al. | |
| 2002/0032680 A1* | 3/2002 | Garber | G06F 16/951 |
| 2003/0225773 A1* | 12/2003 | Jenssen | G06F 40/242 |

(Continued)

FOREIGN PATENT DOCUMENTS

CN     103380426 A    10/2013

OTHER PUBLICATIONS

A. Zouaq, et al.,"Ontologizing Concept Maps using Graph Theory", SAC Proceedings of the ACM Symposium on Applied Computing, Mar. 21, 2011, pp. 1-6.

(Continued)

*Primary Examiner* — Van H Oberly
(74) *Attorney, Agent, or Firm* — Cantor Colburn LLP; Joseph Petrokaitis

(57) ABSTRACT

The present invention relates to text analysis, and discloses a text representation method. Aspects include identifying concepts in the text by using a knowledge base and determining relationship between the concepts and generating a concept graph by using the relationship between the concepts. Aspects also include determining connected components of the concept graph; calculating weight of the connected components and determining the concepts representing the text according to the weight of the connected components. By using correlation between concepts in a knowledge base and according to connected component theory of a graph, finds out a set of concepts which best represents subject of the text, and removes concepts irrelevant to the subject, thus improving accuracy of text representation and reducing noise.

4 Claims, 5 Drawing Sheets

(56) References Cited

U.S. PATENT DOCUMENTS

| | | | |
|---|---|---|---|
| 2010/0114879 A1 | 5/2010 | Zhong et al. | |
| 2010/0153369 A1* | 6/2010 | Peoples | G06F 16/3331 707/722 |
| 2011/0087670 A1 | 4/2011 | Jorstad et al. | |
| 2011/0302168 A1 | 12/2011 | Aggarwal | |
| 2012/0131073 A1 | 5/2012 | Olney | |
| 2012/0284261 A1 | 11/2012 | Byrne et al. | |
| 2013/0318025 A1* | 11/2013 | Alemzadeh | G06N 5/02 706/50 |
| 2014/0337306 A1* | 11/2014 | Gramatica | G06F 16/248 707/706 |
| 2016/0154800 A1 | 6/2016 | Cao et al. | |
| 2016/0154803 A1 | 6/2016 | Cao et al. | |

OTHER PUBLICATIONS

R. Popping, "Text Analysis for Knowledge Graphs", Springer, Quality & Quantity, vol. 41. Issue 5, Oct. 2007, pp. 1-19.

Feng Cao et al., Pending U.S. Appl. No. 14/967,315 entitled "Text Representation Method and Apparatus," filed with the U.S. Patent and Trademark Office on Dec. 13, 2015.

List of IBM Patents or Patent Applictions Treated as Related; (Appendix P), Filed Feb. 2, 2016, 2 pages.

B. Haiyan "L i n k e d D a t a a n d D B p e d i a Case A n a l y s", Institute of Scientific & Technical Information of China, vol. 26, Issue(3), Mar. 9, 2010, p. 1-7.

Cao, Feng et al., Pending U.S. Appl. No. 14/920,341 entitled "Text Representation Method and Apparatus", filed with the U.S. Patent and Trademark Office on Oct. 22, 2015.

Chinese Office Action dated Dec. 4, 2017; 6 pgs.

Wan, Yi "Wikipedia based Conceptual Graph Model and Its Application" (English Abstract) Master's Thesis, Postgraduate Program, Department of Computer Science, Central China Normal University; approved Apr. 2014; 37 pgs.

Yi Wan, et al.,"Wikipedia Based Conceptual Graph Model and its Application" M.S. Degree in Computer Science, Department of Computer Science Central China Normal University, May 28, 2014, p. 1-37.

* cited by examiner

In the UK, Physical Education (PE) is compulsory in state schools until the age of 16, that is, that sports are compulsory for as long as education is compulsory. Every year, more and more parents complain to their children's schools about PE; they believe that their children shouldn't have to participate in physical activity if they don't want to and that it is not a conducive educational activity or environment. Proponents of PE, however, believe that it is a crucial element of all-round schooling and our society's well-being. They insist PE in schools remains one of the few places whereby the youth can be forced to participate in aerobic exercise."

Fig.5

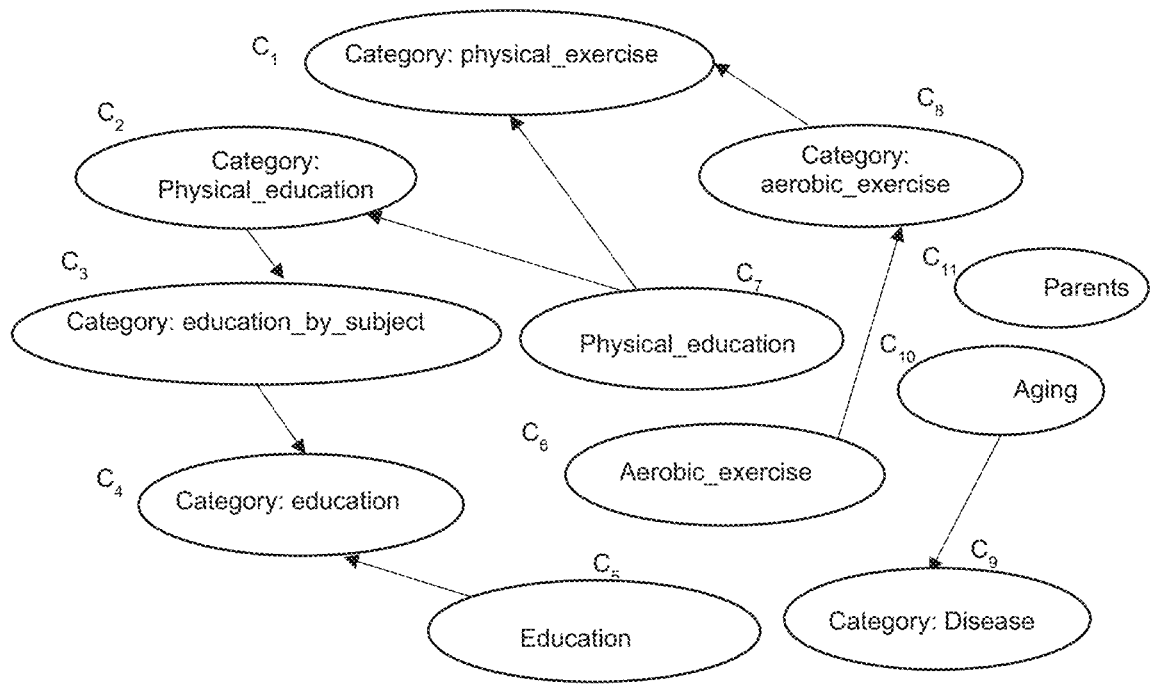

Fig.6

TEXT REPRESENTATION METHOD AND APPARATUS

FOREIGN PRIORITY

This application claims priority to Chinese Patent Application No. 201410705205.X; filed Nov. 28, 2014, and all the benefits accruing therefrom under 35 U.S.C. § 119, the contents of which in its entirety are herein incorporated by reference.

BACKGROUND

The present invention relates to text analysis, and more particularly, to a text representation method and apparatus.

Text analysis has wide application in fields such as information retrieval, data mining, and machine translation. Text analysis refers to extracting representation Of text and its feature items, and converting unstructured original text into structured information which can be identified and processed by a computer, i.e., performing scientific abstraction on text and establishing its mathematical model to describe and replace the text, such that the computer can realize text identification by computing and operating such a model.

Latent semantic analysis (LSA), also known as latent semantic index (LSI), is a known index and retrieval method. This method, like traditional vector space model, uses vectors to represent terms and documents, and determines relationship between terms and documents through relationship between vectors (e.g., angles); the difference lies in that, LSA maps terms and documents to a latent semantic space, thus removing some "noises" in original vector space and improving accuracy in information retrieval. However, LSA still does not solve the problem of polysemy, and only solves the problem of synonym. Because LSA represents each term as a point in latent semantic space, the plurality of meanings of one term correspond to one point in the space and are not distinguished.

The intention of ESA (Explicit Semantic Analysis) is to for a given document segment, ESA will generate a semantic interpreter, which can project this segment to some related wild concepts and perform sorting according to degree of relevancy. The method of ESA determines a set of concepts by only considering similarity between context of the concepts and the text, and does not consider coherence among the concepts.

SUMMARY

In one aspect of the present invention, there is provided a text representation method. The method includes identifying concepts in the text by using a knowledge base and determining relationship between the concepts; and generating a concept graph by using the relationship between the concepts. The method also includes determining connected components of the concept graph, calculating weight of the connected components, and determining the concepts representing the text according to the weight of the connected components.

In another aspect of the present invention, there is provided a text representation apparatus. The apparatus includes a concept identifying module configured to identify concepts in the text by using a knowledge base and determine relationship between the concepts and a concept graph generating module configured to generate a concept graph by using the relationship between the concepts. The apparatus also includes a connected component determining module configured to determine connected components of the concept graph, a weight calculating module configured to calculate weight of the connected components, and a concept determining module configured to determine the concepts representing the text according to the weight of the connected components. By using correlation between concepts in a knowledge base and according to connected component theory of a graph, finds out a set of concepts which best represents subject of the text, and removes concepts irrelevant to the subject, thus improving accuracy of text representation and reducing noise.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 shows an example of a piece of text according to an embodiment of the present invention;

FIG. 6 shows an association graph between concepts in the text example of FIG. 5 and other concepts in a knowledge base;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
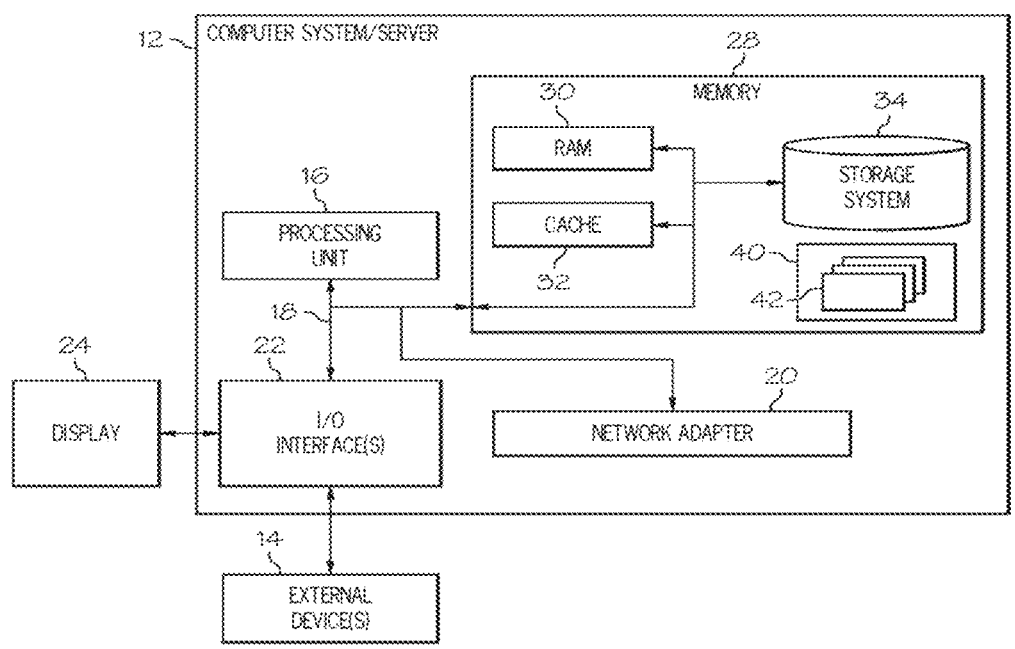
FIG. 1 shows a block diagram of an exemplary computer system which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
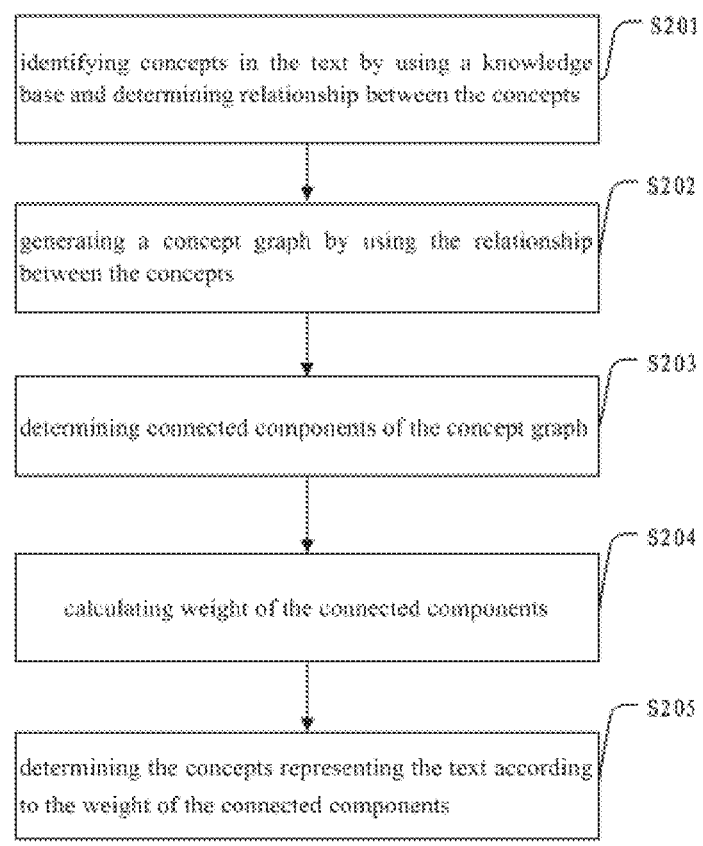
FIG. 2 shows a text representation method according to an embodiment of the present invention.

FIG. 2 shows a text representation method according to an embodiment of the present invention, comprising: at step S201, identifying concepts in the text by using a knowledge base and determining relationship between the concepts; at step S202, generating a concept graph by using the relationship between the concepts; at step S203, determining connected components of the concept graph; at step S204, calculating weight of the connected components; at step S205, determining the concepts representing the text according to the weight of the connected components.

The knowledge base according to an embodiment of the present invention defines concepts and relationship between concepts that have broad contents. The knowledge base is described by RDF (resource description framework), and basic idea of RDF is: (1) collectively referring all the things (specific or abstract, existing or non-existing) which can be identified on Web as "resource"; (2) identifying resource by URI (Universal Resource Identifier); (3) describing features of resources and relationship between the resources by properties. Concept in the knowledge base in embodiments of the present invention is something which possesses distinctiveness and can exist independently, and corresponds to the resources in the RDF identified by URI; for example, currently DBpedia is a relatively typical and mature knowledge base.

In RDF, basic structure of any expression is a set of triples, each triple is comprised of subject, predicate and object. The subject corresponds to resource, is anything that may possess an URI, e.g., http://dbpedia.org/resource/China; the predicate corresponds to properties of the resource, e.g., author, firstname; the object corresponds to value of a property, it may be a character string or another resource, e.g., David or http://dbpeida.org/resource/United_States. It is defined that S is the subject, P is the predicative, and O is the object, then a RDF triple may be expressed as: (S, P, O). In embodiments of the present invention, RDF is used to describe relationship between concepts in a knowledge base, and association between the concepts of the knowledge base may be described by a directional graph. Nodes in the directional graph denote concepts, and directional edges between the nodes denote association relationship between the concepts.

At step S201, identifying concepts in the text by using a knowledge base and determining relationship between the concepts. First, all possible names of the concepts are extracted from the knowledge base to form a name dictionary, and the mapping relationship between the concepts and the names is established. Names of the concepts are extracted by using some properties related to the names in the knowledge base, and properties related to names are looked up in predicative of the RDF triad, e.g., "name", "fullname", "nickname", and the found subjects corresponding to the properties related to the names are used as concepts, and value of properties in the corresponding objective are used as names of concepts, thus establishing a mapping table between the concepts and the names. Similarly, the property "redirect" also gives possible names of the concepts. One concept may correspond to multiple names, and one name may also correspond to multiple concepts. Table 1 illustratively shows a mapping table of some of the names extracted from the knowledge base abc and the concepts.

TABLE 1

| Name | Concept |
|---|---|
| Physical education | http://abc.org/resource/Physical_education |
| PE | |
| parents | |
| human_Parents | http://abc.org/resource/Parent |
| aerobic exercise | |
| aerobic_workout | http://abc.org/resource/Aerobic_exercise |
| cardio_training | |
| age | |
| aging_process | http://abc.org/resource/Aging |
| aged_population | |
| education | http://abc.org/resource/Education |
| educational system | http://abc.org/resource/Master_of_Education |
| | http://abc.org/resource/Local_education_authority |

After obtaining the name dictionary, given a piece of text, all names in the text that appear in the name dictionary may be identified, and at least one concept corresponding to the identified names is determined by using the mapping relationship. For the case that one name corresponds to multiple concepts, semantic disambiguation should be performed, and concept having the same meaning as the identified name is determined from at least one concept according to semantic analysis on context of the text. Semantic disambiguation performs scoring by combining a variety of features, and the concept with the highest score is selected as the concept corresponding to the name. Here the features may include comparing similarity of the name in context of the text and in context of the concept, or obtaining, by collecting statistics, the concept having the largest probability to correspond to the name in corpus of the knowledge base. Those skilled in the art will appreciate that, in addition to the above methods, there may also be many methods to realize semantic disambiguation, as long as the concept corresponding to the names in the text can be determined accurately and uniquely, and the present invention has no limitation thereto.

At step S202, generating a concept graph by using the relationship between the concepts, wherein the concept graph V(G) is an undirected graph, and nodes therein denote concepts, and the path between any two nodes $V_i$ and $V_j$ indicates that in the knowledge base, the concept corresponding to node $V_i$ is associated with the concept corresponding to node $V_j$, and the path does not have direction; if node $V_i$ is directly connected to $V_j$ (there is no other node between the two nodes), the path between nodes $V_i$ and $V_j$ corresponds to an edge between nodes $V_i$ and $V_j$; if there is other node between nodes $V_i$ and $V_j$, then the path between nodes $V_i$ and $V_j$ is formed by connecting the paths between every two adjacent nodes between nodes $V_i$ and $V_j$.

Figure 3:
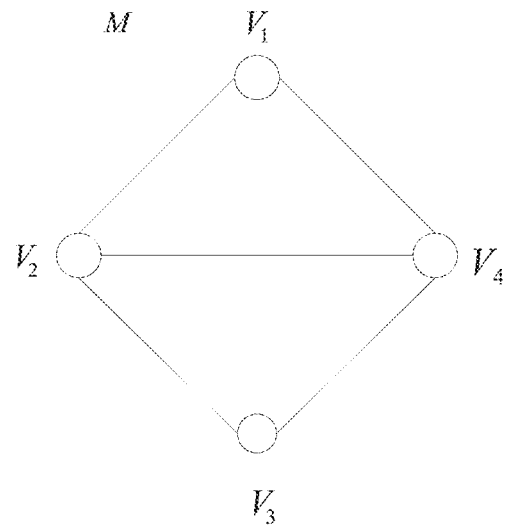
FIG. 3 shows an undirected graph M.
Figure 4:
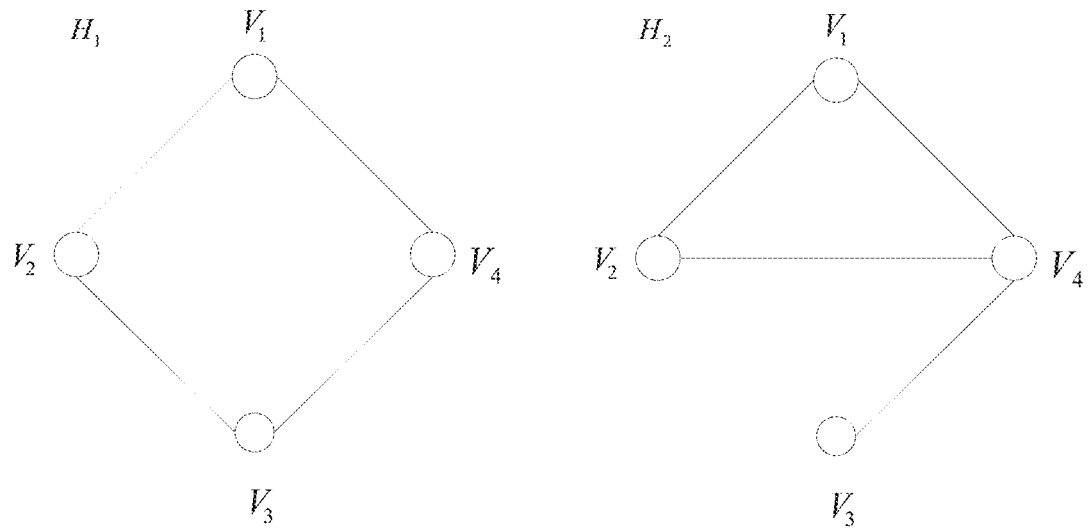
FIG. 4 shows two connected components $H_1$ and $H_2$ of the undirected graph M of FIG. 3.

At step S203, determining connected components of the concept graph, and the maximum connected sub-graph of the undirected graph G is referred as connected component of G, and any connected graph has only one connected component, i.e., itself; in the undirected graph G, if any two different nodes $V_i$ and $V_j$ are connected, then G is called a connected graph. A non-connected unidirectional graph has a plurality of connected components. FIG. 3 shows an undirected graph M, which is a non-connected graph including four nodes $V_1$, $V_2$, $V_3$ and $V_4$; FIG. 4 shows two connected components $H_1$ and $H_2$ of the undirected graph M of FIG. 3.

At step S204, calculating weight of the connected components, and weight of the connected components are calculated according to node weight of the connected components and path weight between the nodes. According to an embodiment of the present invention, the node weight may be determined according to number of times that the concepts corresponding to the nodes appear in the text. According to an embodiment of the present invention, the path weight between the nodes may be determined according to length of path between the nodes representing two concepts in the knowledge base, e.g., the connected components $H_1$ in the FIG. 4; node $V_1$ and $V_2$ are connected directly (there is no other node therebetween); the path $L(V_1V_2)$ between nodes $V_1$ and $V_2$ is formed by the edge between nodes $V_1$ and $V_2$, indicating that the concept corresponding to node $V_1$ is associated with the concept corresponding to node $V_2$. Nodes $V_2$ and $V_3$ are connected directly, and the path $L(V_2V_3)$ between nodes $V_2$ and $V_3$ is formed by the edge between nodes $V_2$ and $V_3$, indicating that the concept corresponding to node $V_2$ is associated with the concept corresponding to node $V_3$. The length of path $L(V_1V_2)$ between nodes $V_1$ and $V_2$ is set to one unit length, and nodes $V_1$ and $V_3$ are connected through node $V_2$, indicating the concept corresponding to node $V_1$ is associated with the concept corresponding to node $V_3$ through the concept corresponding to node $V_2$, and path between nodes $V_1$ and $V_3$ is formed by connecting paths $L(V_1V_2)$ and $L(V_2V_3)$, and length of the path $L(V_1V_3)$ between nodes $V_1$ and $V_3$ is set to two unit length.

Taking the connected component $H_1$ in FIG. 3 for example, statistics about the following are collected: number of times $T_1$ that concept $C_1$ corresponding to node $V_1$ appears in the text, number of times $T_2$ that concept $C_2$ corresponding to node $V_2$ appears in the text, number of times $T_3$ that concept $C_3$ corresponding to node $V_3$ appears in the text, and number of times $T_4$ that concept $C_4$ corresponding to node $V_4$ appears in the text, and node weight of the connected component $H_1$ is $W(V)=T_1+T_2+T_3+T_4$. In the knowledge base, length of the path between concept $C_1$ and concept $C_2$ is $K_1$, length of the path between concept $C_2$ and $C_3$ is $K_2$, length of the path between concept $C_3$ and $C_4$ is $K_3$, length of the path between concept $C_4$ and $C_1$ is $K_4$, and path weight of the connected component $H_1$ is;

$$W(K) = \frac{1}{K_1} + \frac{1}{K_2} + \frac{1}{K_3} + \frac{1}{K_4},$$

according to an embodiment of the present invention, weight $W(H_1)$ of the connected component $H_1$ is calculated as follows:

$$W(H_1) = W(V) + W(K) = (T_1 + T_2 + T_3 + T_4) + \left(\frac{1}{K_1} + \frac{1}{K_2} + \frac{1}{K_3} + \frac{1}{K_4}\right)$$

At step S205, determining the concepts representing the text according to the weight of the connected components. According to an embodiment of the present invention, the concepts representing the text may be determined according to a Top-N pattern. Specifically, weight of a plurality of connected components are sorted in descending order, and the first N connected components are selected; the text is represented by the concepts corresponding to the nodes contained in the first N connected components, wherein N may be specified in advance based on experience. According to an embodiment of the present invention, the connected component with the maximum weight may be selected, and the text is represented by the concept corresponding to the node contained in the connected component with the maximum weight.

For a paragraph of text, a set of concepts that may represent the text all involve similar subjects, and the concepts are closely related. The method according to embodiments of the present invention, by using correlation between concepts in a knowledge base, maps names identified from the text to a concept space of the knowledge base, and according to connected component theory of a graph, finds out a set of concepts which best represents subject of the text, and removes concepts irrelevant to the subject, thus improving accuracy of text representation and reducing noise.

FIG. 5 shows an example of a piece of text according to an embodiment of the present invention, names in the text example are identified by using table 1, i.e., Physical education, PE, education, parents, aerobic exercise and age, and the identified names are mapped to the concepts represented by URIs according to the mapping relationship between the names and concepts, for example, Physical education, PE corresponds to the concept Physical_education in knowledge base abc, http://abc.org/resource/Physical_education, parents corresponds to concept Parent in knowledge base abc, http://abc.org/resource/Parent, aerobic_exercise corresponds to concept Aerobic_exercise in knowledge base abc, http://abc.org/resource/Aerobic_exercise, age corresponds to concept Aging in knowledge base abc: http://abc.org/resource/Aging, education corresponds to the concepts in knowledge base abc:

http://abc.org/resource/Education;
http://abc.org/resource/Master_of_Education; and
http://abc.org/resource/Local_education_authority.

It is uniquely determined that http://abc.org/resource/Education is the concept corresponding to education in the text example through the above described semantic disambiguation method in conjunction with the context.

FIG. 6 shows an association graph between concepts in the text example of FIG. 5 and other concepts in a knowledge base.

Node $C_1$ corresponds to concept Category:physical_exercise in the knowledge base, http://abc.org/ontopology/Category:physical_exercise; Node $C_2$ corresponds to concept Category:Physical_education in the knowledge base, http://abc.org/ontopology/Category:Physical_education; Node $C_3$ corresponds to concept Category:education_by_subject in the knowledge base, http://abc.org/ontopology/Category:education_by_subject; Node $C_4$ corresponds to concept Category:education in the knowledge base, http://abc.org/ontopology/Category:education; Node $C_5$ corresponds to concept Education in the knowledge base, http://abc.org/resource/Education;

Node $C_6$ corresponds to concept Aerobic_exercise in the knowledge base, http://abc.org/resource/Aerobic_exercise; Node $C_7$ corresponds to concept Physical_education in the knowledge base, http://abc.org/resource/Physical_education; Node $C_8$ corresponds to concept Category: aerobic_exercise in the knowledge base, http://abc.org/resource/Category:aerobic_exercise; Node $C_9$ corresponds to concept Category:Disease in the knowledge base, http://abc.org/resource/Category:Disease; and Node $C_{10}$ corresponds to concept Aging in the knowledge base, http://abc.org/resource/Aging; and Node $C_{11}$ corresponds to concept Parent in the knowledge base, http://abc.org/resource/Parent.

As shown in FIG. 6, concept Physical_education is associated with concept Education through concepts Category:physical_education, Category:education_by_subject and Category:education, and length of the path between concepts Physical_education and Aerobic_exercise is 4 units of length; concept physical_education is associated with concept Aerobic_exercise through concepts Category:physical_exercise and Category: aerobic_exercise, and length of the path between concepts Physical_education and Aerobic_exercise is 3 units of length; concept Aging is associated with concept Category:Disease. Concept associated with concept Parent is not found in the knowledge base.

Figure 7:
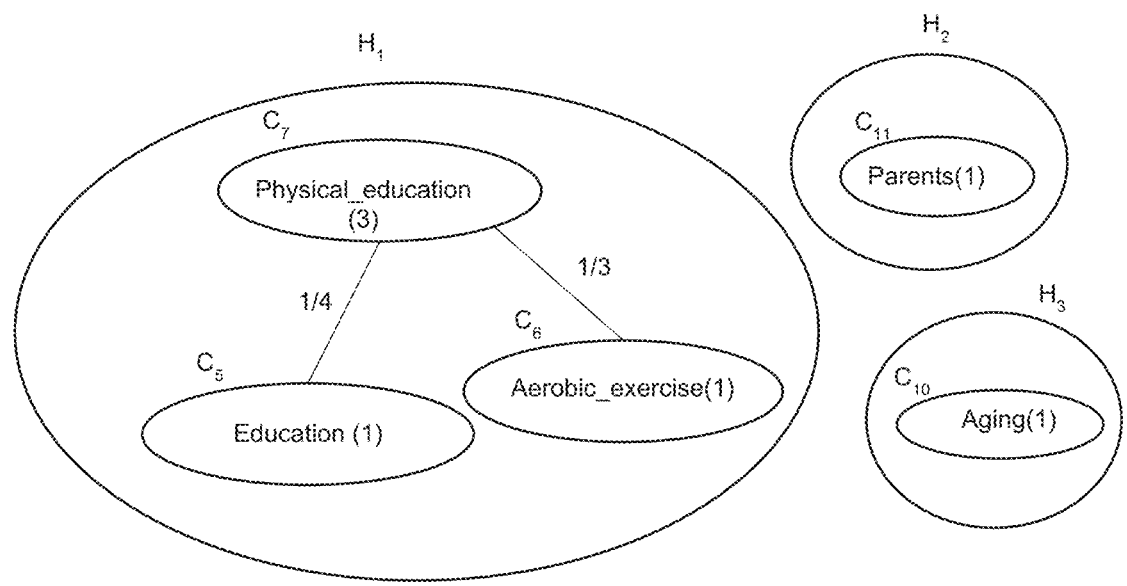
FIG. 7 shows a concept graph generated according to relationship between the concepts identified in the text example.

FIG. 7 shows a concept graph generated according to relationship between the concepts identified in the text example. Since concept Physical_education is associated with concept Education, a path connection will be generated between the two concepts. Since concept physical_education is associated with concept Aerobic_exercise, a path connection will be generated between the two concepts. Concepts Aging and Parent do not have other concept associated therewith, thus they are independent nodes. According to definition of connected component, the generated concept graph has 3 connected components, that is, $H_1$, $H_2$ and $H_3$ respectively.

Statistics about the following are collected: number of times that concept Physical_education appears in the text is 3, number of times that concept Aerobic_exercise appears in the text is 1, number of times that concept Education appears in the text is 1; FIG. 6 shows that length of the path between concepts Physical_education and Education is 4 units of length, and length of the path between concepts Physical_education and Aerobic_exercise is 3 units of length, and weight $W(H_1)$ of the connected component $H_1$ is calculated as follows:

$$W(H_1) = (3+1+1) + (1/4 + 1/3) = 5\frac{7}{12}$$

Both the number of times that concepts Aging and Parent appear in the text is 1, and there is no other concept associated therewith, and there is no path to other nodes.

$W(H_2)=1$ $W(H_3)=1$

According to an embodiment of the present invention, the concepts Physical_education, Aerobic_exercise and Education contained in the connected component $H_1$ having the maximum weight are selected to represent the text example shown in FIG. 5.

Various embodiments for implementing the method of the present invention have been described above with reference to accompanying drawings. Those skilled in the art will appreciate that, the above method may be implemented in software, hardware, or a combination thereof. In addition, those skilled in the art will appreciate that, by implementing steps in the above method in software, hardware or a combination thereof, a text representation apparatus may be provided. Although the apparatus is the same as a general-purpose processing apparatus in hardware structure, due to function of the software contained therein, the apparatus presents a characteristic distinct from the general-purpose processing apparatus, thus forming the apparatus according to embodiments of the present invention.

Figure 8:
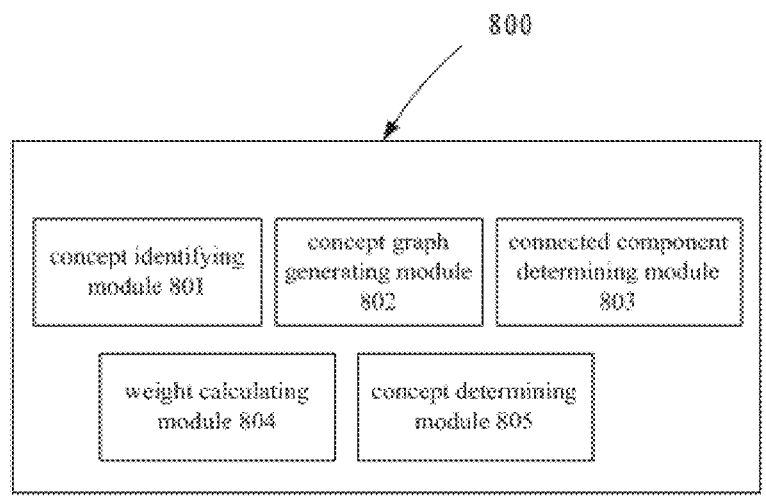
FIG. 8 shows a text representation apparatus 800 according to an embodiment of the present invention.

Based on a same inventive concept, there is also provided a text representation apparatus according to an embodiment of the present invention. FIG. 8 shows a text representation apparatus 800 according to an embodiment of the present invention, comprising: a concept identifying module 801 configured to identify concepts in the text by using a knowledge base and determine relationship between the concepts; a concept graph generating module 802 configured to generate a concept graph by using the relationship between the concepts; a connected component determining module 803 configured to determine connected components of the concept graph; a weight calculating module 804 configured to calculate weight of the connected components; a concept determining module 805 configured to determine the concepts representing the text according to the weight of the connected components.

According to an embodiment of the present invention, wherein the knowledge base describes relationship between concepts by using a resource description language. According to an embodiment of the present invention, the apparatus further comprising: a concept extracting module configured to extract all possible names of the concepts from the knowledge base and form a name dictionary; a mapping establishing module configured to establish mapping between all the possible names in the name dictionary and the concepts; a name identifying module configured to identify all the names in the text that appear in the name dictionary; wherein the concept identifying module 801 is configured to determine at least one concept corresponding to the identified name by using the mapping, and determine concepts having same meaning as the identified names from the at least one concept according to semantic analysis on context of the text.

According to an embodiment of the present invention, wherein nodes of the concept graph correspond to concepts in the text, and paths between the nodes indicate association relationship of concepts in the text corresponding to the nodes.

According to an embodiment of the present invention, wherein weight of the connected components is calculated according to node weight of the connected components and path weight between the nodes.

According to an embodiment of the present invention, wherein the node weight of the connected components is determined according to number of times that the concepts corresponding to the nodes appear in the text, and the path weight between the nodes of the connected components is determined according to length of path between the nodes of the connected components in a directed graph describing association between the concepts of the knowledge base.

According to an embodiment of the present invention, wherein the concept determining module is further configured to represent the text with concepts corresponding to nodes contained in a connected component having the maximum weight.

For specific implementation of each of the above modules, reference may be made to the detailed description of the text representation method according to embodiments of the present invention, the description of which will be omitted here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A text representation apparatus, comprising:
   one or more processors;
   a memory, said memory coupled to the one or more processors;
   a concept identifying module coupled to the one or more processors and configured to identify concepts in a text by using a knowledge base and determine relationship between the concepts;
   wherein concepts are identified by matching names in the text with respective same names appearing in a table comprising names associated with concepts, and
   wherein each concept in the table is associated with a uniform resource identifier;
   a concept graph generating module coupled to the one or more processors and configured to generate a concept graph by using the relationship between the concepts;
   a connected component determining module coupled to the one or more processors and configured to determine connected components of the concept graph, wherein nodes of the concept graph correspond to respective names in the text, each name having an associated concept defined by the table, and paths between the nodes indicate a relationship between concepts corresponding to the nodes;
   a weight calculating module coupled to the one or more processors and configured to calculate a weight of the connected components, wherein the weight is calculated by the following"
   $$W=((T1)+(T2)+(T3))+((1/K1)+(1/K2)),$$
   wherein W is the weight, T1 is a frequency that a first name appears in the text, T2 is a frequency that a second name appears in the text, T3 is a frequency that a third name appears in the text, K1 is a path length is between a concept associated the first name and a concept associated with the second name, and K2 is a path length is between a concept associated the first name and a concept associated with the third name;
   a concept determining module coupled to the one or more processors and configured to determine the concepts representing the text according to a top-N pattern based on the weight of the connected components, wherein the concept determining module removes concepts not relevant to a subject associated with the text and represents the text with concepts corresponding to one or more nodes contained in a connected component having a maximum weight.

2. The apparatus according to claim 1, further comprising:
   a concept extracting module configured to extract all possible names of the concepts from the knowledge base and form a name dictionary;
   a mapping establishing module configured to establish mapping between all the possible names in the name dictionary and the concepts;
   a name identifying module configured to identify all the names in the text that appear in the name dictionary;
   wherein the concept identifying module is configured to determine, for each identified name, at least one concept corresponding to the identified name by using the mapping, and determine, for each identified name, concepts having same meaning as the identified name from the at least one concept according to semantic analysis on context of the text.

3. The apparatus according to claim 1, wherein weight of the connected components is calculated according to node weight of the connected components and path weight between the nodes.

4. The apparatus according to claim 1, wherein the knowledge base describes relationship between concepts by using a resource description language.

* * * * *